United States Patent
Ilani et al.

(10) Patent No.: US 10,698,839 B2
(45) Date of Patent: Jun. 30, 2020

(54) SEED SCRAMBLING

(71) Applicant: Western Digital Technologies, Inc., San Jose, CA (US)

(72) Inventors: Ishai Ilani, Dolev (IL); Eran Sharon, Rishon Lezion (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 15/962,766

(22) Filed: Apr. 25, 2018

(65) Prior Publication Data
US 2019/0179772 A1 Jun. 13, 2019

Related U.S. Application Data

(63) Continuation-in-part of application No. 15/839,668, filed on Dec. 12, 2017, now Pat. No. 10,635,400.

(51) Int. Cl.
G06F 21/72 (2013.01)
G06F 12/14 (2006.01)
G06F 21/79 (2013.01)

(52) U.S. Cl.
CPC .......... G06F 12/1408 (2013.01); G06F 21/72 (2013.01); G06F 21/79 (2013.01)

(58) Field of Classification Search
CPC ...... G06F 12/1408; G06F 21/72; G06F 21/79; G06F 12/14; G06F 3/0616; G06F 3/0661; G06F 3/06; G06F 3/0679; G09C 1/00; H04L 2209/122; H04L 2209/125; H04L 9/0625; H04L 9/0631; H04L 9/28; H04L 9/06
USPC ........................................................ 711/103
See application file for complete search history.

(56) References Cited

U.S. PATENT DOCUMENTS

| 8,700,974 | B2 | 4/2014 | Chung et al. | |
|---|---|---|---|---|
| 9,672,105 | B2 | 6/2017 | Chung et al. | |
| 10,635,400 | | 4/2020 | Sharon et al. | |
| 2002/0037080 | A1* | 3/2002 | Katayama | G11B 20/0021 380/267 |
| 2003/0135798 | A1* | 7/2003 | Katayama | G11B 20/1833 714/710 |
| 2003/0223582 | A1* | 12/2003 | Dagan | G06F 7/582 380/210 |
| 2005/0226407 | A1* | 10/2005 | Kasuya | G09C 1/00 380/28 |

(Continued)

OTHER PUBLICATIONS

U.S. Appl. No. 15/839,668, Office Action, dated Feb. 8, 2019.

(Continued)

Primary Examiner — Mano Padmanabhan
Assistant Examiner — Jean C Edouard
(74) Attorney, Agent, or Firm — Kunzler Bean & Adamson, PC

(57) ABSTRACT

Apparatuses, systems, methods, and computer program products are disclosed for seed scrambling. An apparatus includes a memory element. An apparatus includes a scrambler component. A scrambler component includes an input circuit that receives a random seed. A scrambler component includes a matrix circuit that generates a new seed based on a matrix operation performed on a seed. A scrambler component includes a rotation circuit that forms a shifted seed. A shifted seed is formed by shifting a new seed based on a seed.

14 Claims, 9 Drawing Sheets

(56) References Cited

U.S. PATENT DOCUMENTS

| | | | |
|---|---|---|---|
| 2007/0140485 A1* | 6/2007 | Ghigo | G06F 7/584 380/46 |
| 2008/0151618 A1* | 6/2008 | Sharon | G06F 11/1068 365/185.02 |
| 2008/0215798 A1* | 9/2008 | Sharon | G11C 11/5628 711/103 |
| 2009/0204824 A1* | 8/2009 | Lin | G06F 12/0246 713/193 |
| 2009/0282267 A1 | 11/2009 | Stern et al. | |
| 2009/0323942 A1* | 12/2009 | Sharon | G11C 7/1006 380/44 |
| 2011/0119432 A1 | 5/2011 | Yoon | |
| 2012/0144277 A1 | 6/2012 | Lee et al. | |
| 2013/0083619 A1* | 4/2013 | Jeon | G11C 16/10 365/230.08 |
| 2013/0101111 A1* | 4/2013 | Sharon | G11B 20/0021 380/28 |
| 2013/0315397 A1 | 11/2013 | Tuers et al. | |
| 2014/0215126 A1* | 7/2014 | Avila | G06F 12/0246 711/103 |
| 2014/0310534 A1* | 10/2014 | Gurgi | G06F 12/1408 713/193 |
| 2014/0362990 A1* | 12/2014 | Kim | H04L 25/03872 380/268 |
| 2017/0115884 A1* | 4/2017 | Bhalerao | G06F 3/0604 |
| 2018/0074791 A1* | 3/2018 | Atsumi | G06F 7/582 |
| 2019/0179543 A1 | 6/2019 | Sharon et al. | |

OTHER PUBLICATIONS

U.S. Appl. No. 15/839,668, Final Office Action, dated May 20, 2019.

David Jones, "Good Practice in (Pseudo) Random Number Generation for Bioinformatics Applications." May 7, 2010, pp. 1-13, http://www0.cs.ucl.ac.uk/staff/d.jones/GoodPracticeRNG.pdf.

U.S. Appl. No. 15/839,668, Notice of Allowance, dated Dec. 26, 2019.

* cited by examiner

SEED SCRAMBLING

CROSS-REFERENCES TO RELATED APPLICATIONS

This is a continuation-in-part application of and claims priority to, U.S. patent application Ser. No. 15/839,668 entitled "SEED GENERATION" and filed on 12 Dec. 2017 for Eran Sharon, et al., which is incorporated herein by reference in its entirety, for all purposes.

TECHNICAL FIELD

The present disclosure, in various embodiments, relates to memory die and more particularly relates to seed scrambling for scrambling data stored on memory die.

BACKGROUND

Many electrical circuits and devices, such as data storage devices or the like, include memory die. Memory die may be used to store data. Data may be scrambled before being stored to reduce wear to specific memory cells.

SUMMARY

Apparatuses are presented for seed scrambling. In one embodiment, an apparatus includes a memory element. An apparatus, in certain embodiments, includes a scrambler component. A scrambler component, in some embodiments, includes an input circuit that receives a random seed. In various embodiments, a scrambler component includes a matrix circuit that generates a new seed based on a matrix operation performed on a seed. In one embodiment, a scrambler component includes a rotation circuit that forms a shifted seed. In some embodiments, a shifted seed is formed by shifting a new seed based on a seed.

Methods are presented for seed scrambling. A method, in one embodiment, includes receiving a previous seed used for scrambling data. In various embodiments, a method includes generating a new seed for scrambling data using matrix multiplication of a previous seed. In certain embodiments, a method includes modifying a new seed by applying a function to the new seed based on a previous seed to result in an adjusted new seed.

An apparatus for seed scrambling, in one embodiment, includes means for receiving an initial seed and a previous seed. In some embodiments, an apparatus includes means for selecting an initial seed or a previous seed as a reference seed. In various embodiments, an apparatus includes means for generating an intermediate seed using matrix multiplication of a reference seed. In certain embodiments, an apparatus includes means for performing one or more functions on an intermediate seed to produce a current seed.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
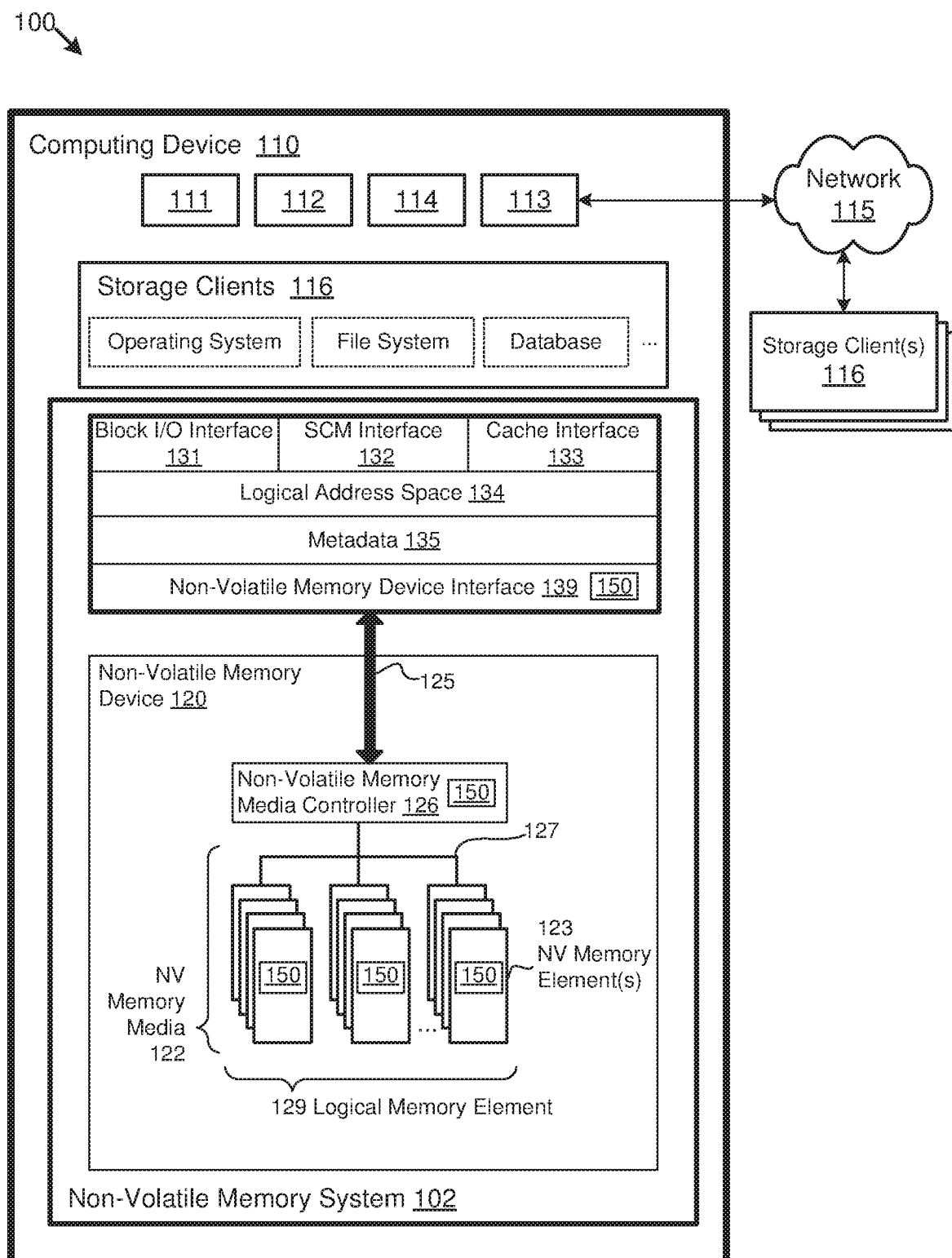
FIG. 1A is a schematic block diagram illustrating one embodiment of a system for seed generation and/or seed scrambling.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 comprising a scrambler component 150 for a non-volatile memory device 120. The scrambler component 150 may be part of and/or in communication with a non-volatile memory media controller 126, a non-volatile memory element 123, a device driver, or the like. The scrambler component 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more non-volatile DIMM (NVDIMM) cards, one or more persistent NVDIMM (NVDIMM-P) cards, one or more cache coherent interconnect for accelerators (CCIX) cards, one or more Gen-Z cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the scrambler component 150 may be embodied as one or more computer readable instructions stored on the non-transitory storage medium 114.

The non-volatile memory system 102, in the depicted embodiment, includes a scrambler component 150. The scrambler component 150, in one embodiment, is configured to generate a random seed. The scrambler component 150, in certain embodiments, may generate a deterministic seed based on a physical address of a memory element (e.g., non-volatile memory device 120, non-volatile memory media 122, non-volatile memory element 123) for storing data. The scrambler component 150 may also form a computed seed based on the random seed and the deterministic seed. By using the scrambler component 150, data may be scrambled using the computed seed before the data is stored. By the computed seed being based on the random seed and the deterministic seed, the computed seed may be randomized and avoid correlations between data sequences programmed physically near one another.

The scrambler component 150, in some embodiments, is configured to receive a previous seed used for scrambling data. The scrambler component 150, in one embodiment, may generate a new seed for scrambling data using matrix multiplication of a previous seed. The scrambler component 150 may also modify a new seed by applying a function to the new seed based on a previous seed to result in an adjusted new seed. By using the scrambler component 150, seeds generated based off of a same initial seed may be sufficiently different to be not highly correlated.

In one embodiment, the scrambler component 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the scrambler component 150 may comprise executable software code, such as a device driver or the like, stored on the computer readable storage medium 114 for execution on the processor 111. In a further embodiment, the scrambler component 150 may include a combination of both executable software code and logic hardware.

In one embodiment, the scrambler component 150 is configured to receive storage requests from a device driver or other executable application via a bus 125 or the like. The scrambler component 150 may be further configured to transfer data to/from a device driver and/or storage clients 116 via the bus 125. Accordingly, the scrambler component 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the scrambler component 150 may receive storage requests as an API call from a storage client 116, as an IO-CTL command, or the like.

According to various embodiments, a non-volatile memory controller 126 in communication with one or more stripe placement components 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM) and/or persistent memory.

While legacy technologies such as NAND flash may be block and/or page addressable, storage class memory, in one embodiment, is byte addressable. In further embodiments, storage class memory may be faster and/or have a longer life (e.g., endurance) than NAND flash; may have random write access instead of or in addition to the sequential programming of NAND flash (e.g., allowing write-in-place programming of data); may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the non-volatile memory media controller 126 over a bus 125, as described above.

Figure 1B:
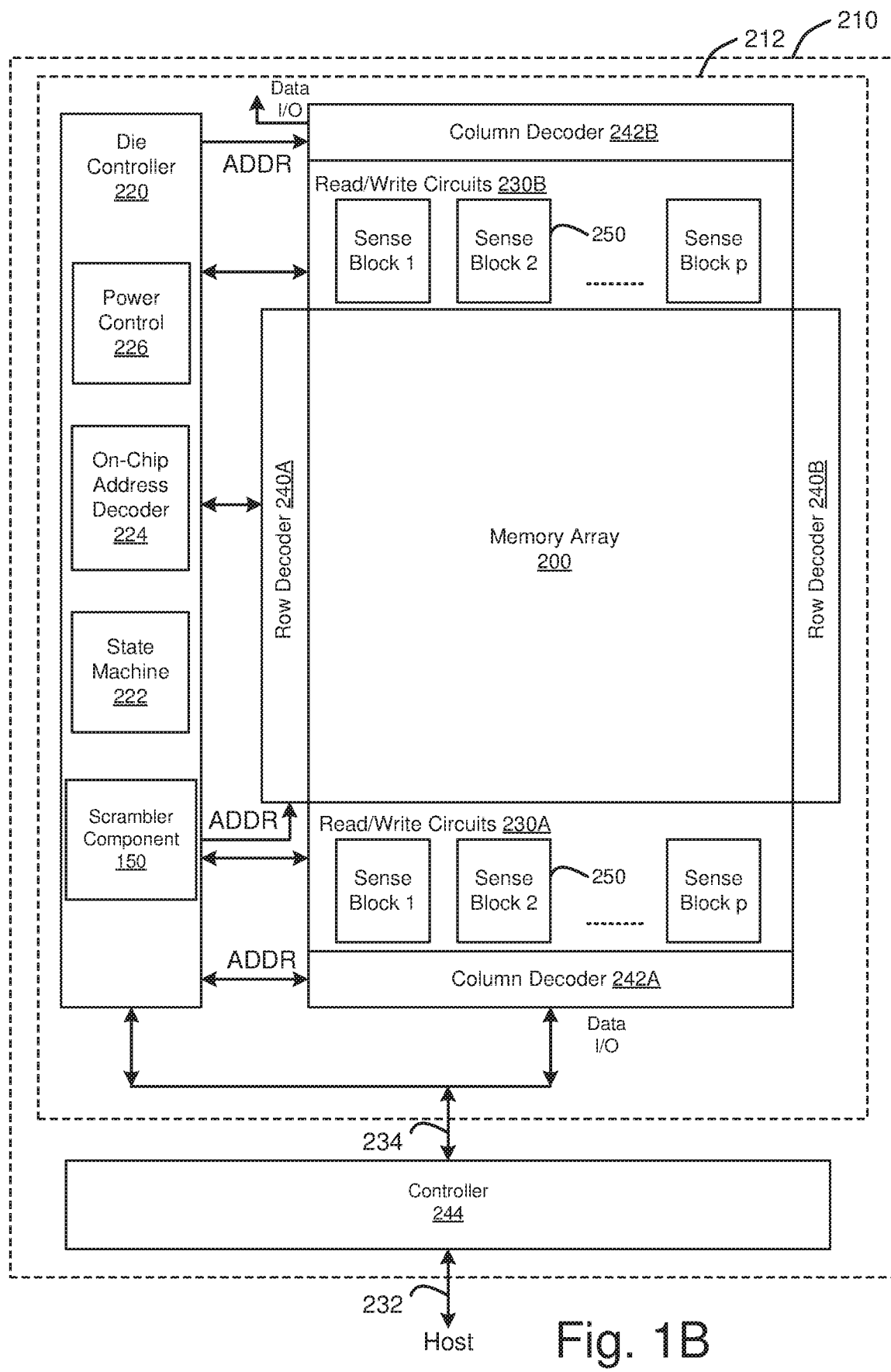
FIG. 1B is a schematic block diagram illustrating another embodiment of a system for seed generation and/or seed scrambling.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Die controller 220, in one embodiment, cooperates with the read/write circuits 230A/230B to perform memory operations on the memory array 200. The die controller 220, in certain embodiments, includes a scrambler component 150, a state machine 222, and an on-chip address decoder 224. In one embodiment, the state machine 222 comprises at least a portion of the scrambler component 150. In a further embodiment, the controller 244 comprises at least a portion of the scrambler component 150. In various embodiments, one or more of the sense blocks 250 comprises at least a portion of the scrambler component 150.

The scrambler component 150, in one embodiment, is configured to generate a seed based on a random seed and a physical address of a storage device (e.g., non-volatile memory device 120, non-volatile memory media 122, non-volatile memory element 123) for storing data, and store the seed with the data.

The scrambler component 150, in another embodiment, is configured to receive a seed, generate a new seed based on a matrix operation performed on the seed, and form a shifted seed by shifting the new seed based on the seed.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. In certain embodiments, the state machine 222 includes an embodiment of the scrambler component 150. The scrambler component 150, in certain embodiments, is embodied as software in a device driver, hardware in a device controller 244, and/or hardware in a die controller 220 and/or state machine 222.

In one embodiment, one or any combination of die controller 220, scrambler component 150, decoder circuit 224, state machine circuit 222, decoder circuit 242A, decoder circuit 242B, decoder circuit 240A, decoder circuit 240B, read/write circuits 230A, read/write circuits 230B, and/or controller 244 can be referred to as one or more managing circuits.

Figure 2:
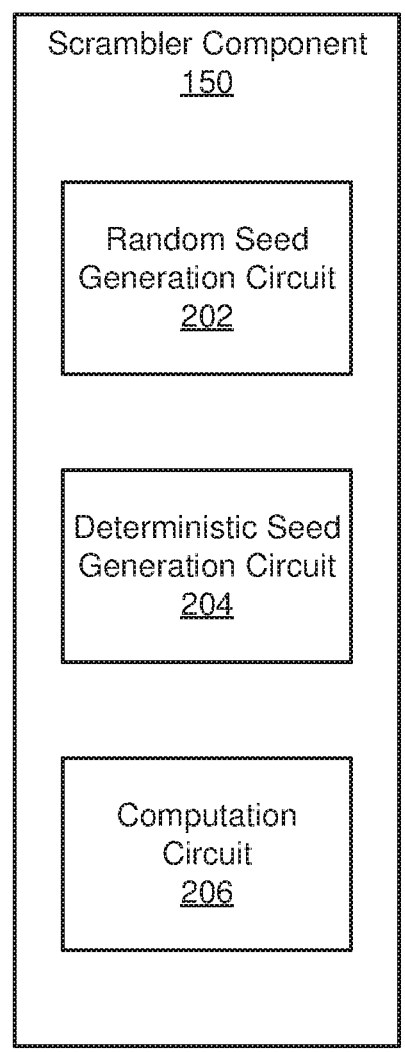
FIG. 2 is a schematic block diagram illustrating one embodiment of a scrambler component.

FIG. 2 depicts one embodiment of a scrambler component 150 (e.g., randomizer). The scrambler component 150 may be substantially similar to the scrambler component 150 described above with regard to FIGS. 1A and/or 1B. In general, as described above, the scrambler component 150 generates a random seed, generates a deterministic seed based on a physical address of the memory element for storing data, and forms a computed seed based on the random seed and the deterministic seed. Accordingly, the scrambler component 150 may facilitate generating a computed seed that is random and different from a seed used for scrambling data for a memory location adjacent to a memory location used for storing data scrambled using the computed seed. In the depicted embodiment, the scrambler component 150 includes a random seed generation circuit 202, a deterministic seed generation circuit 204, and a computation circuit 206.

In one embodiment, the random seed generation circuit 202 generates a random seed (Sr). In certain embodiments, the random seed may be generated by any suitable random source. In various embodiments, the random seed may include any suitable number of bits, such as 4 bits, 8 bits, 16 bits, 32 bits, 64 bits, 128 bits, and so forth. Moreover, in one embodiment, the random seed generation circuit 202 may facilitate the random seed being any suitable seed except all zeros. The random seed may be generated using a dedicated circuit or an existing circuit having random properties. In some embodiments, the random seed generation circuit 202 includes a random number generator (e.g., dedicated circuit) used to generate the random seed. In various embodiments, the random seed is generated based on an existing circuit having random properties (e.g., a system clock). For example, in one embodiment, the random seed is generated by sampling a system clock. In some embodiments, the random seed may be generated by sampling certain bits of a system clock (e.g., 4 least significant bits "LSBs", 3 LSBs, 2 LSBs, etc.). In certain embodiments, using a random seed may facilitate uniform wearing of a memory element used for storing data scrambled based on the random seed. Furthermore, using a random seed may facilitate inhibiting deep erase of memory elements. Moreover, the random seed may be generated so that the random seed changes randomly from one programming cycle to another.

In certain embodiments, the deterministic seed generation circuit 204 generates a deterministic seed (Sd). In some embodiments, the deterministic seed may be based on a physical address of a memory element for storing data. For example, the physical address of the memory element for storing the data may be encoded to generate the deterministic seed. In various embodiments, the deterministic seed generation circuit 204 generates the deterministic seed such that the deterministic seed satisfies a minimum distance threshold from another seed for an adjacent physical address (or physically near pages, physically near error-correcting code "ECC" blocks, physically near memory elements, physically near memory units, etc.). In one embodiment, the minimum distance threshold includes the deterministic seed being different from another seed for an adjacent physical address by at least four bits.

In certain embodiments, the deterministic seed is determined based on a hamming code (e.g., extended hamming code) determined using a physical address for storing data. In various embodiments, the hamming code transforms the physical address so that seeds for physically adjacent addresses have a number of bit differences satisfying a threshold. In some embodiments, the hamming code may facilitate for any two flash management units (FMUs) which are physically adjacent (e.g., having physical addresses P1 and P2) (or physically adjacent addresses, physically near pages, physically near error-correcting code "ECC" blocks, physically near memory elements, physically near memory units, etc.), the transformed physical addresses Sd1 and Sd2 having a large number of bit differences. More specifically, the hamming code may facilitate, if P1 and P2 are different solely in the 11 LSBs of P1 and P2, then Sd1 and Sd2 will be different by at least 4 bits.

In one example of generating the deterministic seed, the physical address (P) may include 16 bits (e.g., P=[p15 p14 p13 p12 p11 p10 p9 p8 p7 p6 p5 p4 p3 p2 p1 p0]) having the following configuration: FMU number=[p1 p0]; plane number=[p2]; page number=[p13 p12 p11 p10 p9 p8 p7 p6 p5 p4 p3]; and die number=[p15 p14]. Moreover, the deterministic seed may be generated by performing the following transform on P: Sd=[t15 t14 t13 t12 t11 p10 p9 p8 p7 p6 p5 p4 p3 p2 p1 p0]; where t15=p15+p0+p5+p6+p7+p8+p9+p10; t14=p14+p0+p2+p3+p4+p5+p6+p8; t13=p13+p0+p1+p2+p4+p5+p7+p9; t12=p12+p0+p1+p3+p4+p6+p7+p10; and t11=p11+p0+p1+p2+p3+p8+p9+p10.

In another example of generating the deterministic seed, an index ($P_i$)=[p3 p2 p1 p0] represents the 4 LSBs of a page index, F=[f2 f1 f0] represents the FMU index within a 32 KB page in which f2 denotes a plane index. Moreover, in this example, the deterministic seed may be generated by performing the following transform on $P_i$ and F: Sd=[1+p0+p2+p3+f0+f1+f2, 1+p0+p1+p3+f1+f2, p0+p1+p2+f0+f2, p1+p2+p3+f0+f1+f2, p3+f1, p2+f0, p1, p0]. Furthermore, in another example, the deterministic seed may be generated using a 128 byte look up table (LUT) indexed by [f2 f1 f0 p3 p2 p1 p0].

In various embodiments, the deterministic seed generation circuit 204 generates the deterministic seed such that the deterministic seed is not a linear combination of a set of deterministic seeds associated with adjacent physical addresses. Such an embodiment may be used in embodiments in which scrambling is based on a linear function of the seed, such as using a linear feedback shift register (LFSR). For example, if the deterministic seeds of 3 FMUs satisfy Sd3=Sd1+Sd2 (Sd3 is a linear combination of a set of deterministic seeds), then the pseudo random scrambling sequences may satisfy PR3=PR1+PR2, and if the data is fixed, there may be correlations between programmed data sequences which may lead to disturb effects. By generating the deterministic seed so that the deterministic seed is not a linear combination of a set of deterministic seeds, correlations between programmed data sequences may be reduced, thereby reducing disturb effects.

In one embodiment, the deterministic seed generation circuit 204 generates a deterministic seed by encoding a physical address using a non-linear code. For example, the non-linear code may be implemented as a LUT that translates a physical address into a deterministic seed. By using the LUT based on a physical address, the deterministic seeds for physically near pages (or physically near ECC blocks) may be linearly independent. Specifically, using the LUT based on the physical address may facilitate any set of up to W physically near pages (or FMUs) have linear independence between their corresponding deterministic seed strings. As used herein, W may be a design parameter that determines a maximum number of linearly independent strings such that these strings correspond to W physical near pages (or FMUs). Moreover, when constructing the non-linear code used in the LUT with parameter W, each string in a set of W strings may have at least a distance d between each one of all other strings in the set. Accordingly, seeds of W physically near pages (or FMUs) may be linearly independent facilitating uniform distribution being applied for each wordline and neighboring cells. As such, a minimum distance dictated by the deterministic seed is ensured thereby facilitating scrambler correlations and data dependent disturb issues.

In a further example of generating the deterministic seed, an index (P)=[p3 p2 p1 p0] represents the 4 LSBs of a page index, F=[f2 f1 f0] represents the FMU index within a 32 KB page in which f2 denotes a plane index. Moreover, in this example, 8 non-linear codes (e.g., for each combination of F) may be constructed where there are 4 input bits (P) and 8 output bits (Sd). The construction of each non-linear code may be done in a manner in which 16 codewords of length 8 are determined such that each set of consecutive W codewords (e.g., that correspond to W physically near FMUs) are linearly independent and have minimum distance of d. Furthermore, the deterministic seed may be generated using a 128 byte LUT indexed by [f2 f1 f0 p3 p2 p1 p0].

In some embodiments, the computation circuit 206 forms (e.g., generates) a computed seed (e.g., scrambling seed) based on the random seed and the deterministic seed. The computed seed may include any suitable number of bits, such as 4 bits, 8 bits, 16 bits, 32 bits, 64 bits, 128 bits, and so forth. In various embodiments, the computed seed may include a result of a logic operation performed on the random seed and the deterministic seed. In such embodiments, the logic operation may include an AND operation, an OR operation, an exclusive OR (XOR) operation, or another operation. In certain embodiments, the computed seed includes a concatenation of the result of a logic operation and a random seed. In certain embodiments, the computed seed includes the random seed. For example, the computed seed may be computed by the following: computed seed=[XOR(Sd, Sr) Sr]. As another example, the computed seed may be computed by the following: computed seed=[Sd+Sr, Sr]. In various embodiments, the computed seed may be appended to a data header prior to encoding (e.g., scrambling) the data (with the data including the data header). Accordingly, the computed seed may be extracted from the data header after decoding the data in order to decode (e.g., descramble) the data.

The minimum distance threshold may be based on certain minimum distance properties that the deterministic seed is configured to satisfy. The minimum distance properties may be facilitated by construction of the deterministic seed. In one example, two physically near FMUs (e.g., a first FMU and a second FMU) may be considered. The first FMU may have a Seed1=[XOR(Sd1, Sr1) Sr1] and the second FMU may have a Seed2=[XOR(Sd2, Sr2) Sr2]. If Sr1=Sr2, then the difference between XOR(Sd1, Sr1) and XOR(Sd2, Sr2) will equal the difference between Sd1 and Sd2, which is at least the minimal distance of the algorithm used for constructing Sd (e.g., minimum distance d). Moreover, if XOR (Sd1, Sr1)=XOR(Sd2, Sr2), then because Sd1 and Sd2 have at least a minimum distance, then Sr1 and Sr2 may have the same minimum distance. Thus, overall Seed1 and Seed2 may have at least a minimum distance of the algorithm used for constructing Sd (e.g., minimum distance d). Various embodiments of constructing Sd, as described herein, facilitate at least a 4 bit difference between physically near memory elements. By having the deterministic seed satisfying the minimum distance threshold, correlation and/or data dependent disturb issues may be reduced. Accordingly, by using the computed seed described herein, uniform wearing of memory elements may be facilitated, physically near memory elements (e.g., pages) may be programmed with uncorrelated random data thereby avoiding data dependent disturb effects, linear correlation may be reduced, data robustness may be improved, bit error rates may be reduced, reliability may be improved, and/or defective parts per million (DPPM) may be reduced.

In various embodiments, the scrambler component 150 may be used to store the computed seed with the data (e.g., in a data header that is stored with the data). Moreover, in some embodiments, the scrambler component 150 may be used to scramble the data using the computed seed. In such embodiments, the computed seed may be appended to the scrambled data and stored with the scrambled data. In addition, in such embodiments, the data may be scrambled using an LFSR. In certain embodiments, the scrambler component 150 may facilitate storing the data at a physical address of a memory element. Furthermore, in one embodiment, the scrambler component 150 may be used to determine the computed seed (e.g., by extracting the seed from the stored data, by extracting the deterministic seed from the stored data) based on information (e.g., the data including the data header) stored at the physical address of the memory element. In various embodiments, the scrambler component 150 may descramble (e.g., unscramble) the data based on the extracted seed.

The scrambler component 150 may scramble the data based on the computed seed using any suitable method. In some embodiment, the scrambler component 150 may scramble the data by flipping binary values of bits of the data based on the computed seed. As used herein, the term flipping binary values of a bit means inverting the binary value of the bit. In certain embodiments, the scrambler component 150 may scramble the data by pseudo-randomizing the values of bits of the data based on the computed seed. In such embodiments, the scrambler component 150 pseudo-randomizes the values of bits of data in a reversible manner so that the bits may be converted back to their original data state. In some embodiments, the scrambler component 150 may scramble the data by XORing it with a pseudo random bit sequence that is generated as a function of the computed seed (e.g., using an LFSR that is initialized with the computed seed). In some embodiments, the scrambler component 150 may scramble the data by using encryption based on the computed seed to pseudo-randomizes the values of bits of the data. In one embodiment, the scrambler component 150 may scramble the data by rearranging bits of the data based on the computed seed.

Figure 3:
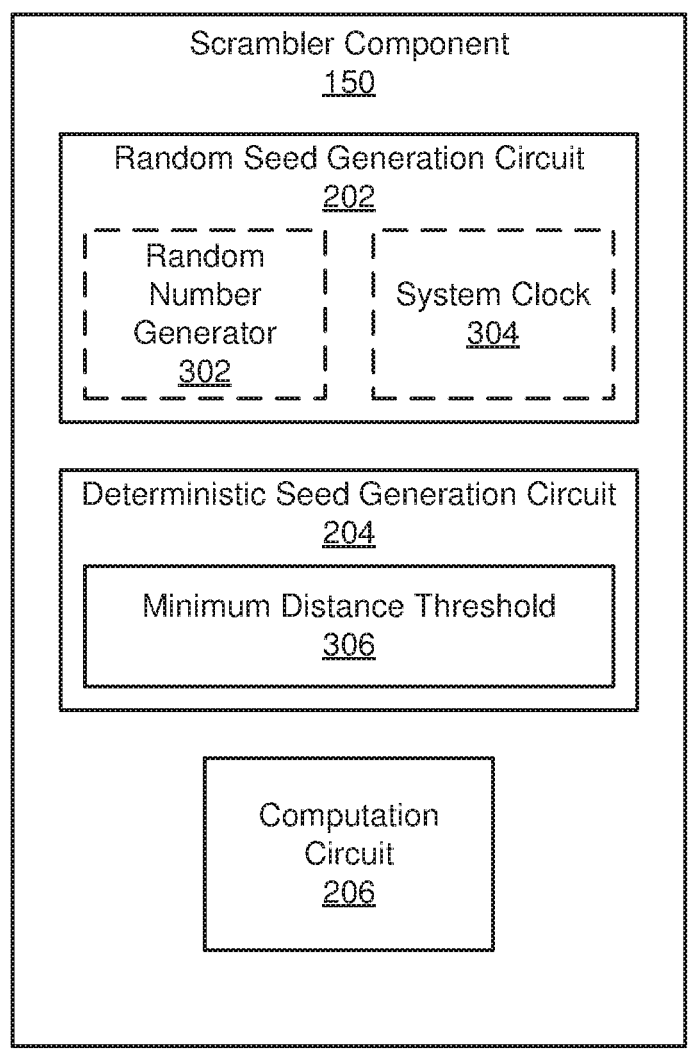
FIG. 3 is a schematic block diagram illustrating another embodiment of a scrambler component.

FIG. 3 depicts another embodiment of a scrambler component 150 (e.g., randomizer). The scrambler component 150 may be substantially similar to the scrambler component 150 described above with regard to FIGS. 1A, 1B, and/or 2. In general, as described above, the scrambler component 150 generates a random seed, generates a deterministic seed based on a physical address of the memory element for storing data, and forms a computed seed based on the random seed and the deterministic seed. Accordingly, the scrambler component 150 may facilitate generating a computed seed that is random and different from a seed used for scrambling data for a memory location adjacent to a memory location used for storing data scrambled using the computed seed. In the depicted embodiment, the scrambler component 150 includes the random seed generation circuit 202, the deterministic seed generation circuit 204, and the computation circuit 206. The random seed generation circuit 202, the deterministic seed generation circuit 204, and the computation circuit 206 may be substantially similar to the random seed generation circuit 202, the deterministic seed generation circuit 204, and the computation circuit 206 described in relation to FIG. 2. The scrambler component 150 also may include a random number generator 302, a system clock 304, and/or a minimum distance threshold 306.

In some embodiments, the random number generator 302 may be used to generate a random seed. In one embodiment, the random number generator 302 may be a dedicated circuit used specifically for generating a random seed. In various embodiments, the random seed generated by the random number generator 302 may include any suitable number of bits, such as 4 bits, 8 bits, 16 bits, 32 bits, 64 bits, 128 bits, and so forth. Moreover, in one embodiment, the random seed generator 302 may generate any suitable random seed except all zeros. In certain embodiments, the random number generator 302 may be based on an existing number generator in the system (e.g., a random number generator of another block, such as the ECC).

In various embodiments, the system clock 304 may be used to generate a random seed. In one embodiment, the system clock 304 may be part of an existing circuit having random properties. In some embodiments, the random seed generated by the system clock 304 may include any suitable number of bits, such as 4 bits, 8 bits, 16 bits, 32 bits, 64 bits, 128 bits, and so forth. Moreover, in one embodiment, the system clock 304 may generate any suitable random seed except all zeros. In certain embodiments, the random seed is generated by sampling the system clock 304. In some embodiments, the random seed may be generated by sampling certain bits of the system clock 304 (e.g., 4 LSBs, 3 LSBs, 2 LSBs, etc.).

In certain embodiments, the minimum distance threshold 306 may be any suitable minimum distance between seeds for memory elements that are physically near each other (e.g., adjacent, within a distance in which a correlation may affect each other). In some embodiments, the minimum distance threshold 306 may be measured by a number of bits in a seed that are different from bits in another seed. For bits to be different, the bits have to be a different value and be in the same position. For example, for seeds having the following format [b1 b2 b3 b4 b5 b6 b7 b8], a first seed [1 0 1 1 0 1 1 0] and a second seed [1 0 1 1 1 0 0 1] have four bits the same and four bits different. Specifically, the first and second seeds have bits b1, b2, b3, and b4 the same, and bits b5, b6, b7, and b8 different.

Figure 4:
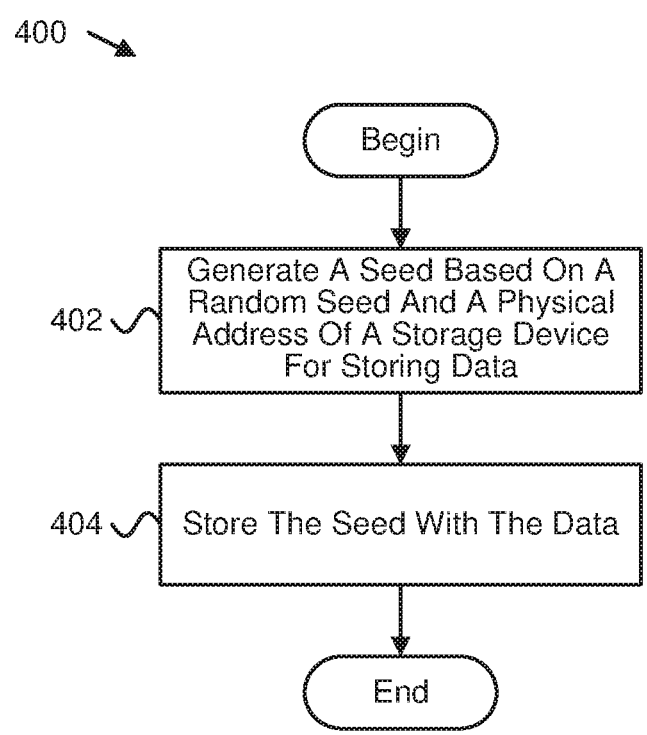
FIG. 4 is a schematic flow chart diagram illustrating one embodiment of a method for seed generation.

FIG. 4 is a schematic flow chart diagram illustrating one embodiment of a method 400 for seed generation. The method 400 begins, and the computation circuit 206 generates 402 a seed based on a random seed and a physical address of a storage device for storing data. In one embodiment, the scrambler component 150 stores 404 the seed with the data, and the method 400 ends.

Figure 5:
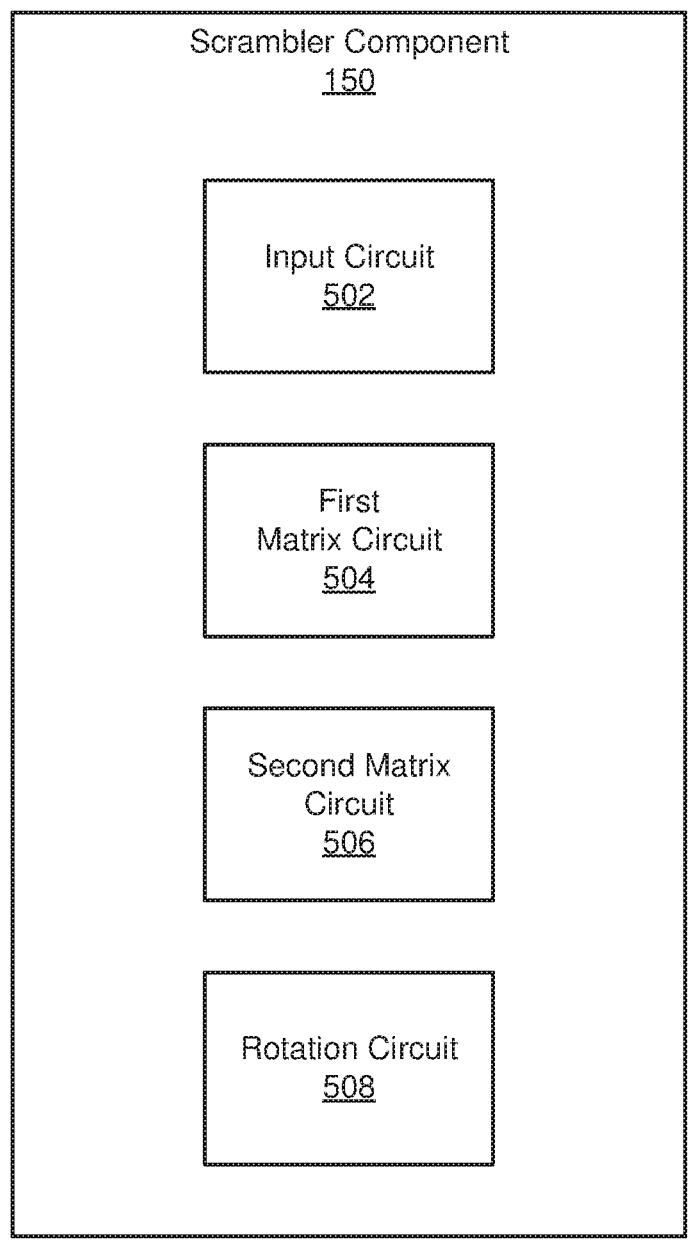
FIG. 5 is a schematic block diagram illustrating a further embodiment of a scrambler component.

FIG. 5 is a schematic block diagram illustrating a further embodiment of a scrambler component 150. The scrambler component 150 may be substantially similar to the scrambler component 150 described above with regard to FIGS. 1A and/or 1B. In general, as described above, the scrambler component 150 receives a seed, generates a new seed (e.g., an output DFF 712 of FIG. 7) based on a first matrix operation performed on the seed (e.g., a DFF logic unit 710 of FIG. 7), and forms a shifted seed by shifting the new seed based on the seed (e.g., via a first rotation unit 714). The shifted seed is input to a second matrix operation unit (e.g., an output logic unit 718) which generates an initial scrambling vector (e.g., at an output of the output logic unit 718 and an input of a second rotation unit 720). In certain embodiments, the initial scrambling vector may be input to a second rotation unit (e.g., a second rotation unit 720) to generate a scrambling vector which is used by XOR logic (e.g., an XOR logic unit 724) to scramble a corresponding data. This operation may be repeated for multiple cycles, wherein the new seed for each cycle is generated by applying the first matrix operation to the seed generated by the previous cycle. Accordingly, the scrambler component 150 may facilitate generating a sequence of seeds which may be the same as generated by a scrambler which does not implement the rotations from a first rotation unit and/or a second rotation unit, but the scrambling vectors will be different. The scrambling vectors generated by this method for different initial seeds may be less correlated than scrambling vectors generated by other methods. For example, in other methods, if s1, s2, s3 are three initial seeds such that s3=s1 XOR s2, then this relationship will also be true for all the scrambling vectors at each cycle of the scrambling generation. In the current method this is no longer true. In the depicted embodiment, the scrambler component 150 includes an input circuit 502, a first matrix circuit 504, a second matrix circuit 506, and a rotation circuit 508.

In one embodiment, the input circuit 502 receives a seed. In some embodiments, the input circuit 502 may receive an initial seed (e.g., seed received by the scrambler component 150 from an external device to the scrambler component 150, a computed seed as described herein) and/or a previously used seed (e.g., seed formed based on the initial seed). The seed received by the input circuit 502 may be a seed used for generating a scrambling vector, and the scrambling vector may be used for scrambling data. In certain embodiments, the input circuit 502 may receive an initial seed and, after modifying the initial seed, the input circuit 502 may receive a previously used seed. In various embodiments, the input circuit 502 may select either the initial seed or the previously used seed for use by the scrambler component 150. In one embodiment, the input circuit 502 may select the initial seed until the previously used seed is input to the input circuit 502, then the input circuit 502 may select the previously used seed. The initial seed and/or the previously used seed may have any suitable number of bits. In some embodiments, the initial seed and/or the previously used seed may have 2, 4, 8, 16, 32, 33, 45, or 60 bits.

In certain embodiments, the first matrix circuit 504 (e.g., the DFF logic unit 710) and the second matrix circuit 506 (e.g., the output logic unit 718) perform one or more matrix operations that together generate a scrambling vector for scrambling data. For example, in one embodiment, the first matrix circuit 504 may be used to generate a new seed based on a previous seed, and the second matrix circuit 506 may be used to generate a scrambling vector based on the new seed. In such embodiments, a first rotation may be applied to the output of the first matrix circuit 504 to generate a rotated seed that is input to the second matrix circuit 506. Moreover, a second rotation may be applied to the output of the second matrix circuit 506 (e.g., a scrambling vector) to generate a rotated scrambling vector. As may be appreciated, some embodiments may include the first rotation, while other embodiments may include the first and second rotations. In some embodiments, a matrix operation includes matrix multiplication on a seed. In other embodiments, a matrix operation includes any suitable matrix operation. In one embodiment, a number of bits of a seed before a matrix operation matches a number of bits of a seed after the matrix operation (e.g., the first matrix circuit 504). In another embodiment, a number of bits of a seed before a matrix operation does not match a number of bits of a seed after the matrix operation (e.g., the second matrix circuit 506). In various embodiments, a matrix operation includes forming a matrix from the seed, then multiplying the matrix by itself. In certain embodiments, a matrix operation includes forming a matrix using matrix multiplication based on the seed and a number of times that the seed will be used.

In some embodiments, the rotation circuit 508 forms a shifted seed. In certain embodiments, the shifted seed is formed by shifting a new seed based on an initial seed and/or previous seed. Moreover, the shifted seed may be shifted by a first rotation circuit (e.g., a first rotation unit 714 of FIG. 7) and/or a second rotation circuit (e.g., a second rotation unit 720 of FIG. 7). In certain embodiments, a new seed (e.g., output from the output DFF 712) may be shifted by the first rotation circuit by one or more bits in a first vector to result in a rotated seed. Moreover, in various embodiments, the rotated seed may be provided as an input to the second matrix circuit 506 and an output from the second matrix circuit 506 may be shifted by the second rotation circuit by one or more bits in a second vector to result in a rotated scrambling vector. In certain embodiments, the number of bits to shift a seed and/or the vector to shift the seed may be determined based on an initial seed and/or a previous seed. For example, the number of bits to shift the seed and/or the vector to shift the seed may be determined based on selected bits of the initial seed and/or the previous seed. In various embodiments, the selected bits of the initial seed and/or the previous seed may be provided to shift logic that determines the number of bits to shift the new seed and/or the direction to shift the new seed based on a value of the selected bits.

In certain embodiments, the rotation circuit 508 includes a first rotation circuit and a second rotation circuit in order to perform two separate rotations and/or shifts. Each of the first and second rotation circuits may shift the new seed by one or more bits and/or in a specific direction determined based on the initial seed and/or the previous seed. In some embodiments, the first rotation circuit shifts the new seed in a first vector and the second rotation circuit shifts the new seed in a second vector. In such embodiments, the first direction is different from the second direction. In various embodiments, the first rotation circuit shifts the new seed in the first direction based on a first portion of the seed (e.g., a first certain number of bits of the seed, such as the first five bits, the last eight bits, the first seven bits, etc.) and the second rotation circuit shifts the new seed in the second direction based on a second portion of the seed (e.g., a second certain number of bits of the seed different from the first certain number of bits of the seed, such as the last six bits, the first four bits, the last eleven bits, etc.).

In various embodiments, the rotation circuit 508 may modify a seed by applying a function (e.g., matrix operation) to the seed based on an initial seed and/or a previous seed to result in an adjusted seed. In some embodiments, the function includes one or more rotation functions. In other embodiments, the function may not include one or more rotation functions, but may instead include an addition function, a subtraction function, a multiplication function, a division function, a scaling function, a transposing function (e.g., certain bits switch places), and/or a masking function, for example. As may be appreciated, a rotation function may rotate bits of a seed a certain number of places. For example, a rotation function that rotates a seed by five bits to the rights is shown as follows: unrotated seed="101100101110001111"; rotated seed="011111011001011100". As another example, a rotation function that rotates a seed by seven bits to the left is shown as follows: unrotated seed="101100101110001111"; rotated seed="011100011111011001".

In certain embodiments, the function applied by the rotation circuit 508 includes a multiplication and/or scaling function. In various embodiments, a multiplication function multiplies an input seed by a matrix. In one embodiment, the rotation circuit 508 includes a first rotation function, a multiplication function, and a second rotation function. In such an embodiment, the first rotation function may rotate a seed to result in a rotated seed, the multiplication function may multiply the rotated seed by a matrix to result in an initial scrambling vector, and the second rotation function may rotate the initial scrambling vector to result in an adjusted scrambling vector. In various embodiments, data is scrambled based on the initial scrambling vector and/or the adjusted scrambling vector.

Figure 6:
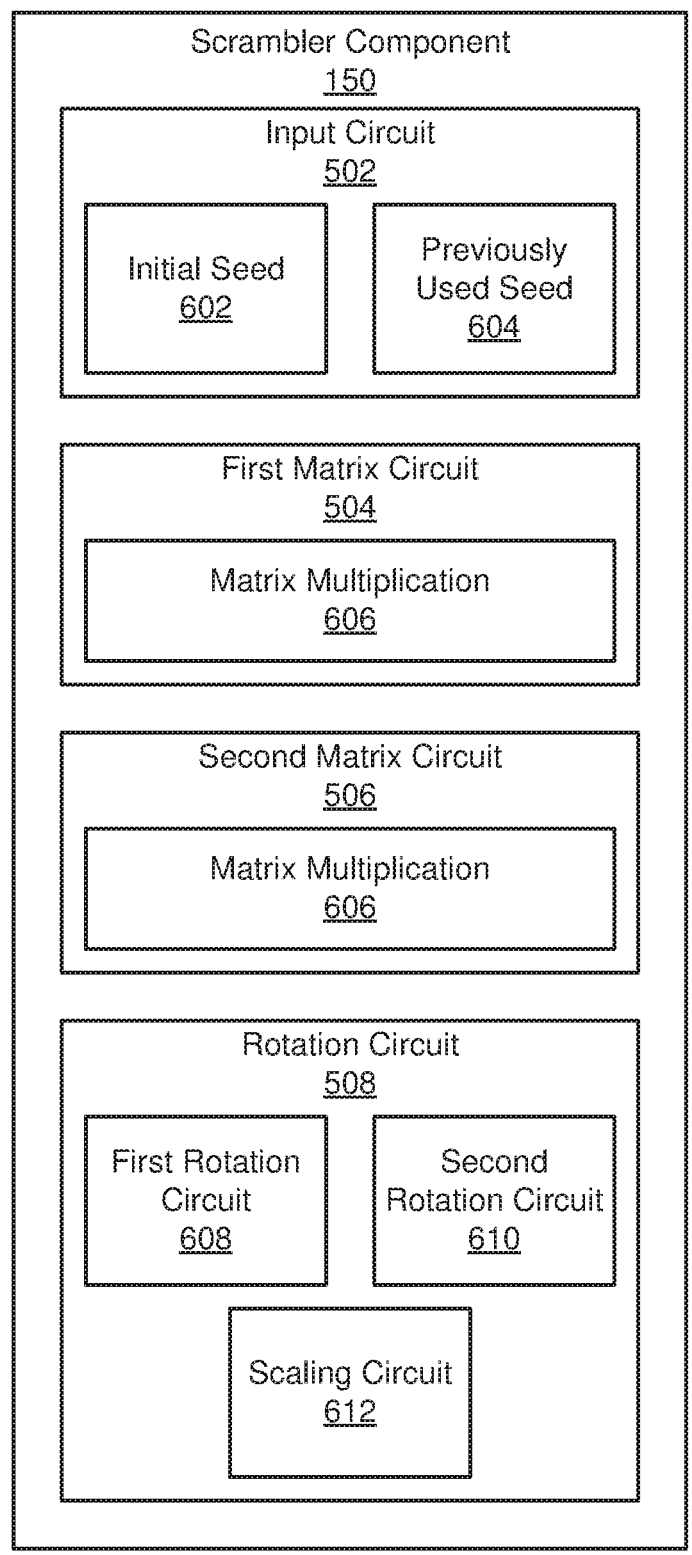
FIG. 6 is a schematic block diagram illustrating an additional embodiment of a scrambler component.

FIG. 6 is a schematic block diagram illustrating an additional embodiment of a scrambler component 150. The scrambler component 150 may be substantially similar to the scrambler component 150 described above with regard to FIGS. 1A, 1B, and/or 5. In general, as described above, the scrambler component 150 receives a seed, generates a new seed based on a matrix operation performed on the seed, and forms a shifted seed by shifting the new seed based on the seed. Accordingly, the scrambler component 150 may facilitate generating a shifted seed that is different from other seeds used for scrambling data so that there is not a high correlation between the shifted seed and the other seeds (e.g., reduce linear dependence). In the depicted embodiment, the scrambler component 150 includes the input circuit 502, the matrix circuit 504, and the rotation circuit 506. The input circuit 502, the matrix circuit 504, and the rotation circuit 506 may be substantially similar to the input circuit 502, the matrix circuit 504, and the rotation circuit 506 described in relation to FIG. 5. The input circuit 502 may include an initial seed 602 and a previously used seed 604. Moreover, each of the first matrix circuit 504 and the second matrix circuit 506 may include a matrix multiplication 606. Furthermore, the rotation circuit 508 may include a first rotation circuit 608 applied to a first vector, a second rotation circuit 610 applied to a second vector, and a scaling circuit 612. As may be appreciated, the first vector may be different from the second vector.

In some embodiments, the initial seed 602 may be a seed received by the scrambler component 150 from an external device to the scrambler component 150 and/or a computed seed as described in relation to FIG. 2. In certain embodiments, the previously used seed 604 may be a seed formed based on the initial seed 602.

In various embodiments, the matrix multiplication 606 may be used to form many seeds based on the initial seed 602. The matrix multiplication 606 may use the initial seed 602 and a number of times that the initial seed 602 is to be used to form a matrix that includes seeds for the number of times that the initial seed 602 is to be used. The matrix multiplication 606 may multiply a matrix formed from the initial seed 602 with itself to form a matrix that includes seeds for a number of times that the initial seed 602 is to be used.

In some embodiments, the first rotation circuit 608 may shift a seed by one or more bits and/or in a specific direction determined based on the initial seed 602 and/or the previously used seed 604 to result in a first shifted seed. In certain embodiments, the second rotation circuit 610 may shift the first shifted seed by one or more bits and/or in a specific vector determined based on the initial seed 602 and/or the previously used seed 604 to result in a second shifted seed. In some embodiments, the first rotation circuit 608 shifts the seed in a first vector and the second rotation circuit 610 shifts the first shifted seed in a second vector. In such embodiments, the first vector is different from the second vector. In various embodiments, the first rotation circuit 608 shifts the seed in the first vector based on a first portion of the seed (e.g., a first certain number of bits of the seed, such as the first five bits, the last eight bits, the first seven bits, etc.) and the second rotation circuit 610 shifts the first shifted seed in the second vector based on a second portion of the seed (e.g., a second certain number of bits of the seed different from the first certain number of bits of the seed, such as the last six bits, the first four bits, the last eleven bits, etc.).

In various embodiments, the scaling circuit 612 receives an output (e.g., the first shifted seed) from the first rotation circuit 608 and provides an input (e.g., a scaled first shifted seed) to the second rotation circuit 610. In such embodiments, the scaling circuit 612 may multiply the output of the first rotation circuit 608 by a matrix to produce a result. The result is provided to the second rotation circuit 610. In certain embodiments, a number of bits of the seed received by the scaling circuit 612 may be different from a number of bits of the seed produced by the scaling circuit 612. For example, in one embodiment, the scaling circuit 612 may receive a seed having 33 bits and may produce a seed having 128 bits. As another example, the scaling circuit 612 may receive a seed having 33 bits and may produce a seed having 256 bits. As may be appreciated, the number of bits received by the scaling circuit 612 may be any suitable number (e.g., 2, 4, 8, 16, 32, 64, 128, 256, etc.) and the number of bits of the seed produced by the scaling circuit 612 may be any suitable number (e.g., 64, 128, 256, 512, etc.).

Figure 7:
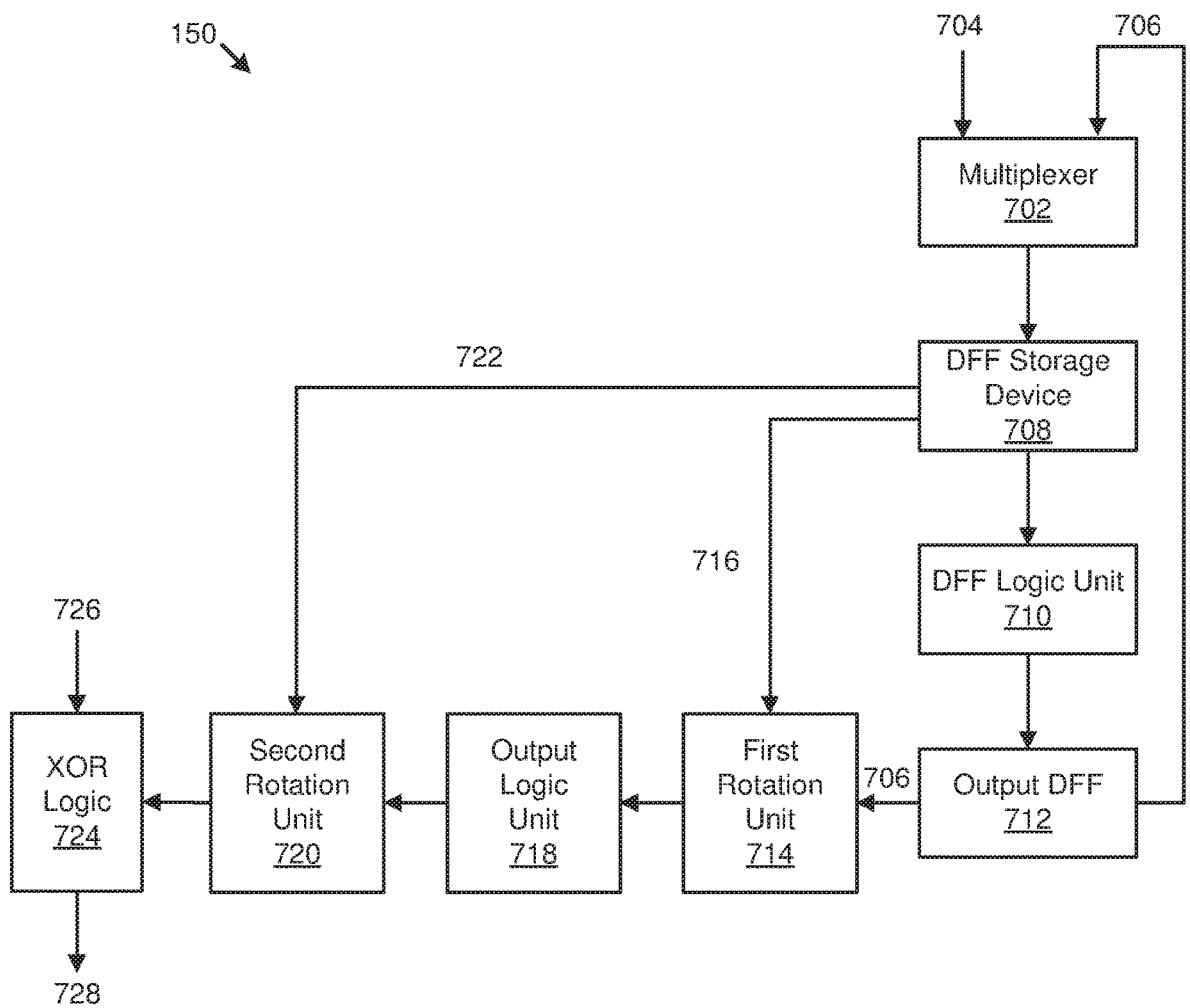
FIG. 7 is a schematic block diagram illustrating yet another embodiment of a scrambler component.

FIG. 7 is a schematic block diagram illustrating yet another embodiment of a scrambler component 150. The scrambler component 150 may be used to facilitate reducing linear dependence resulting from data scrambled using seeds based on an initial seed. The scrambler component 150 includes a multiplexer 702 that receives an initial seed 704 (e.g., the initial seed 602) and a previously used seed 706 (e.g., the previously used seed 604). The multiplexer 702 may be any suitable type of multiplexer 702 that selects one of the initial seed 704 and the previously used seed 706 as an output seed. The multiplexer 702 provides its output seed (s) to a data feed forward (DFF) storage device 708. The DFF storage device 708 may be any suitable type of storage device capable of storing the output seed s received from the multiplexer 702. The DFF storage device 708 provides its stored seed s to DFF logic 710. To understand one embodiment of the operation of the DFF logic 710 and an output logic 718, the following mathematical information is provided. Let $g(x)=x^n+g_{n-1}x^{n-1}+g_{n-2}x^{n-2}+\ldots+g_1x+1$ be a primitive polynomial over a field of 2 elements GF(2).

Let $$A = \begin{pmatrix} 0 & 1 & \ldots & 0 & 0 \\ \vdots & \ldots & \ddots & \vdots & \vdots \\ 0 & 0 & 0 & 1 & 0 \\ 0 & 0 & \ldots & 0 & 1 \\ 1 & g_1 & g_2 & \ldots & g_{n-1} \end{pmatrix}$$

be a companion matrix of g(x).

Accordingly, for any $i<j<2^n$, a first row of $A^i$ is different from the first row of $A^j$ (where all the operations are done over the field GF(2)). Aggregating the first rows of $A^0, A^1, A^2, \ldots, A^{Z-1}$ into a matrix results in a matrix AA with Z rows and n columns, where all the rows of AA are different from one another. Moreover, for any $k<l<2^n/Z$ the rows of the matrices $AA \cdot A^{kZ}$ are all different from the rows of $AA \cdot A^{lZ}$. It follows that if s is a random seed vector of length n, then the scrambling sequences $AA \cdot A^{kZ}s$ and $AA \cdot A^{lZ} s$ are statistically independent scrambling sequences. The embodiment of FIG. 7 makes use of this mathematical structure to generate independent scrambling vectors. The DFF logic 710 multiplies the stored seed s by the matrix $A^Z$ to generate a new seed (denoted s'). If the first rotation unit 714 is ignored, s' is multiplied by AA at the output logic unit 718 to generate a scrambling vector associated with s'. s' is then multiplied again by the DFF logic 710 matrix $A^Z$ to generate a new seed (denoted s"). s" is multiplied by AA at the output logic unit 718 to generate a new scrambling vector associated with s", and this process may continue for $2^n/Z$ cycles and generate multiple scrambler vectors which are independent of one another. However, not including the first rotation unit 714 and the second rotation unit 720, for any initial seeds, any linear dependencies between the seeds may be carried on to a linear dependency between the scrambling sequences. Therefore, the embodiment of FIG. 7 includes the first rotation unit 714 and the second rotation unit 720. The first rotation unit 714 acts on the seed s while the second rotation unit 720 is applied to an initial scrambling vector and rotates it to get a modified scrambling vector. These rotations (independently and\or jointly) have the effect that linear dependencies between initial seeds do not translate into linear dependencies between scrambling vectors.

The output DFF 712 provides the previously used seed 706 to the multiplexer 702 and to the first rotation unit 714. The first rotation unit 714 (e.g., the first rotation circuit 608) shifts the previously used seed 706 based on a first portion 716 of the output seed s. For example, the first rotation unit 714 may shift the previously used seed 706 a first vector and/or a first number of bits based on the first portion 716 of the output seed s. The first portion 716 of the output seed s may be any suitable selection of bits of the output seed s, such as the first five bits, the last seven bits, the first ten bits, the nine middle bits, and so forth. Being based on the first portion 716 may mean that the first vector and/or the first number of bits are determined based on a calculation using the first portion 716. For example, a certain vector may be selected in response to the sum of the bits of the first portion 716 being odd and another vector may be selected in response to the sum of the bits of the first portion 716 being even. As another example, the first number of bits may be five in response to a value of the first portion 716 being less than or equal to 15, and the first number of bits may be nine in response to the value of the first portion 716 being greater than 15. Accordingly, the first rotation unit 714 may shift the previously used seed 706 to output a first shifted seed. In some embodiments, the first shifted seed and the previously used seed 706 may each have the same number of bits (e.g., 16, 32, 33, 64, and/or 128 bits, and so forth).

The first rotation unit 714 provides the first shifted seed to output logic 718. The output logic 718 may multiply the first shifted seed by a matrix Z to result in a scrambling vector. Then, the output logic 718 may provide the scrambling vector to the second rotation unit 720. As may be appreciated, in response to multiplying the first shifted seed by the matrix Z, the number of bits of the seed may increase. In some embodiments, the number of bits of the seed may increase by 2, 4, 6, 8, 9, and/or 10 times, or more. In one embodiment, the number of bits of the seed may increase from 33 bits to 128 or 256 bits.

The second rotation unit 720 (e.g., the second rotation circuit 610) shifts the scrambling vector based on a second portion 722 of the output seed s. For example, the second rotation unit 720 may shift the scaled first shifted seed a second vector and/or a second number of bits based on the second portion 722 of the output seed s. The second portion 722 of the output seed s may be any suitable selection of bits of the output seed s, such as the last six bits, the first eight bits, the last eleven bits, the ten middle bits, and so forth. Moreover, the second portion 722 of the output seed s may be different than the first portion 716 of the output seed s. Being based on the second portion 722 may mean that the second vector and/or the second number of bits are determined based on a calculation using the second portion 722. For example, a certain vector may be selected in response to the sum of the bits of the second portion 722 being odd and another vector may be selected in response to the sum of the bits of the second portion 722 being even. As another example, the second number of bits may be six in response to a value of the second portion 722 being greater than or equal to 15, and the second number of bits may be eight in response to the value of the second portion 722 being less than 15. Accordingly, the second rotation unit 720 may shift the scaled first shifted seed to output a shifted scrambling vector. In some embodiments, the shifted scrambling vector and the scrambling vector may each have seeds having the same number of bits (e.g., 64, 128, 256, and/or 512 bits, and so forth).

The second rotation unit 720 provides the shifted scrambling vector to exclusive OR (XOR) logic 724. In some embodiments, the XOR logic 724 receives data 726 and performs an XOR operation on the data 726 using the shifted scrambling vector to produce scrambled data 728. As may be appreciated, a number of bits of a seed of the shifted scrambling vector may match a number of bits of data 726 with which the XOR operation is performed. As may be appreciated, by using the first rotation unit 714 and the second rotation unit 720, linear dependency of the scrambled data 728 produced by the scrambler component 150 may be reduced.

Figure 8:
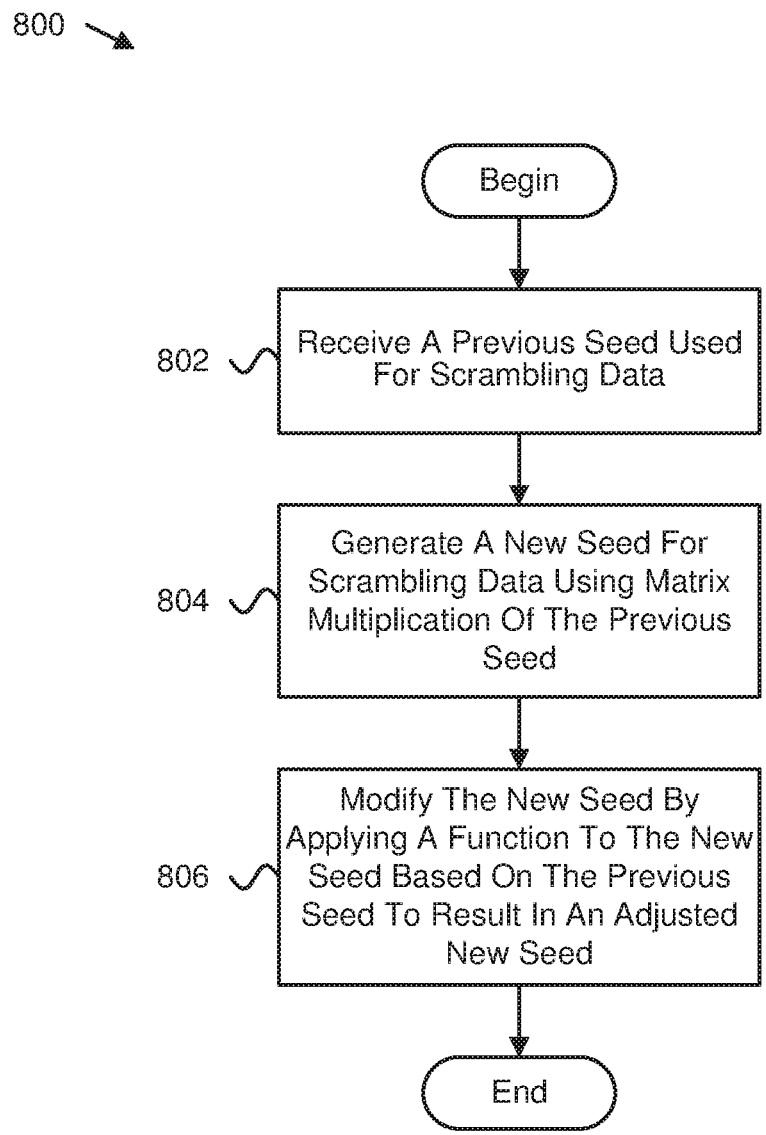
FIG. 8 is a schematic flow chart diagram illustrating another embodiment of a method for seed generation.

FIG. 8 is a schematic flow chart diagram illustrating another embodiment of a method 800 for seed generation. The method 800 begins, and the input circuit 502 receives 802 a previous seed used for scrambling data. In certain embodiments, the matrix circuit 504 generates 804 a new seed for scrambling data using matrix multiplication of the previous seed. In one embodiment, the rotation circuit 506 modifies 806 the new seed by applying a function to the new seed based on the previous seed to result in an adjusted new seed, and the method 800 ends.

A means for generating a random seed, in various embodiments, may include one or more of a scrambler component 150, a random seed generation circuit 202, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating a random seed.

A means for generating a deterministic seed, in certain embodiments, may include one or more of a scrambler component 150, a deterministic seed generation circuit 204, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating a deterministic seed.

A means for generating a scrambling seed using a random seed and a deterministic seed, in some embodiments, may include one or more of a scrambler component 150, a computation circuit 206, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating a scrambling seed using a random seed and a deterministic seed.

A means for scrambling data using a scrambling seed, in various embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for scrambling data using a scrambling seed.

A means for storing scrambled data, in certain embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for storing scrambled data.

A means for extracting a scrambling seed from scrambled data, in some embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for extracting a scrambling seed from scrambled data.

A means for unscrambling scrambled data using a scrambling seed, in various embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for unscrambling scrambled data using a scrambling seed.

A means for receiving an initial seed and a previous seed, in certain embodiments, may include one or more of a scrambler component 150, an input circuit 502, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for receiving an initial seed and a previous seed.

A means for selecting an initial seed or a previous seed as a reference seed, in some embodiments, may include one or more of a scrambler component 150, an input circuit 502, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for selecting an initial seed or a previous seed as a reference seed.

A means for generating an intermediate seed using matrix multiplication of a reference seed, in various embodiments, may include one or more of a scrambler component 150, a matrix circuit 504, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating an intermediate seed using matrix multiplication of a reference seed.

A means for performing one or more functions on an intermediate seed to produce a current seed, in certain embodiments, may include one or more of a scrambler component 150, a matrix circuit 504, a rotation circuit 506, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for performing one or more functions on an intermediate seed to produce a current seed.

A means for altering an order of bits of an intermediate seed based on a reference seed to produce a current seed, in some embodiments, may include one or more of a scrambler component 150, a matrix circuit 504, a rotation circuit 506, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for altering an order of bits of an intermediate seed based on a reference seed to produce a current seed.

A means for shifting an order of bits of an intermediate seed a plurality of times based on a reference seed to produce a current seed, in some embodiments, may include one or more of a scrambler component 150, a matrix circuit 504, a rotation circuit 506, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for shifting an order of bits of an intermediate seed a plurality of times based on a reference seed to produce a current seed.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
a memory element; and
a scrambler component comprising:
an input circuit that receives a seed;
a matrix circuit that generates a new seed based on a matrix operation performed on the seed; and
a rotation circuit that forms a shifted seed, wherein the shifted seed is formed by shifting the new seed a number of bit positions determined based on the seed, the rotation circuit comprises a first rotation circuit and a second rotation circuit, and the first rotation circuit rotates the new seed in a first direction in a first vector and the second rotation circuit shifts the new seed in a second direction in a second vector, wherein the first direction is different from the second direction.

2. The apparatus of claim 1, wherein the scrambler component comprises a second matrix circuit that performs a second matrix operation and generates a scrambling vector based on the second matrix operation, and the second matrix operation is performed on either the shifted seed or the new seed.

3. The apparatus of claim 2, wherein the first rotation circuit and the second rotation circuit generate a shifted scrambling vector based on a third matrix operation performed on the scrambling vector.

4. The apparatus of claim 1, wherein the seed comprises an initial seed.

5. The apparatus of claim 1, wherein the seed comprises a previously used seed.

6. The apparatus of claim 1, wherein the matrix operation comprises matrix multiplication.

7. The apparatus of claim 1, wherein the first vector is different from the second vector.

8. The apparatus of claim 1, further comprising a scaling circuit that receives an output from the first rotation circuit and provides an input to the second rotation circuit.

9. The apparatus of claim 1, wherein the first rotation circuit shifts the new seed in the first vector based on a first portion of the seed and the second rotation circuit shifts the new seed in the second vector based on a second portion of the seed.

10. A method comprising:
receiving a previous seed used for scrambling data;
generating a new seed for scrambling data using matrix multiplication of the previous seed; and
modifying the new seed by applying one or more rotation functions to the new seed a number of bit positions determined based on the previous seed to result in an adjusted new seed, wherein the one or more rotation functions comprise a first rotation function and a second rotation function, the first rotation function rotates the new seed in a first direction to result in a rotated new seed, and the second rotation function rotates a seed resulting from an operation on the rotated new seed in a second direction to result in the adjusted new seed, wherein the first direction is different from the second direction.

11. The method of claim 10, wherein the function comprises a multiplication function.

12. The method of claim 11, wherein the multiplication function multiplies an input seed by a matrix.

13. An apparatus comprising:
means for receiving an initial seed and a previous seed;
means for selecting one of the initial seed or the previous seed as a reference seed;
means for generating an intermediate seed using matrix multiplication of the reference seed; and
means for performing one or more functions on the intermediate seed to produce a current seed, the one or more functions comprising altering an order of bits of the intermediate seed to produce the current seed, the altered order of the bits comprising a number of bit positions determined based on the reference seed, wherein the means for performing the one or more functions comprise a first rotation function and a second rotation function, the first rotation function rotates the intermediate seed in a first direction to result in a rotated intermediate seed, and the second rotation function rotates a seed resulting from an operation on the rotated intermediate seed in a second direction to result in the current seed, wherein the first direction is different from the second direction.

14. The method of claim 13, wherein the means for performing the one or more functions comprises means for shifting an order of bits of the intermediate seed a plurality of times based on the reference seed to produce the current seed.

\* \* \* \* \*